F. W. KEAGLE.
PISTON PIN BEARING.
APPLICATION FILED OCT. 5, 1916.

1,281,784. Patented Oct. 15, 1918.

WITNESSES
James F. Crown,
W. F. Kellogg.

INVENTOR
Fred W. Keagle,
BY Richard Bowen.
ATTORNEY

UNITED STATES PATENT OFFICE.

FRED W. KEAGLE, OF DAVIS, ILLINOIS.

PISTON-PIN BEARING.

1,281,784.

Specification of Letters Patent.   Patented Oct. 15, 1918.

Application filed October 5, 1916.   Serial No. 123,928.

*To all whom it may concern:*

Be it known that I, FRED W. KEAGLE, a citizen of the United States, residing at Davis, in the county of Stephenson and State of Illinois, have invented certain new and useful Improvements in Piston-Pin Bearings, of which the following is a specification.

This invention has reference, generally, to improvements in bearings, and more particularly, to a wear compensating bushing.

The invention has for its principal object to provide a bearing, especially adapted for use in the mounting of piston pins in pistons, wherein the wear is taken up by moving the bushing inwardly to maintain the diameter of its bore to coöperate with the piston pin.

Another object is to provide a bushing that when being adjusted to take up wear, will prevent distortion of the bore therethrough.

Still another object is to provide a bushing that will be cheap to manufacture, being simple in construction, and of such material that will form a good bearing metal adapted, under compression, to have its homogeneity increased.

Figure 1:
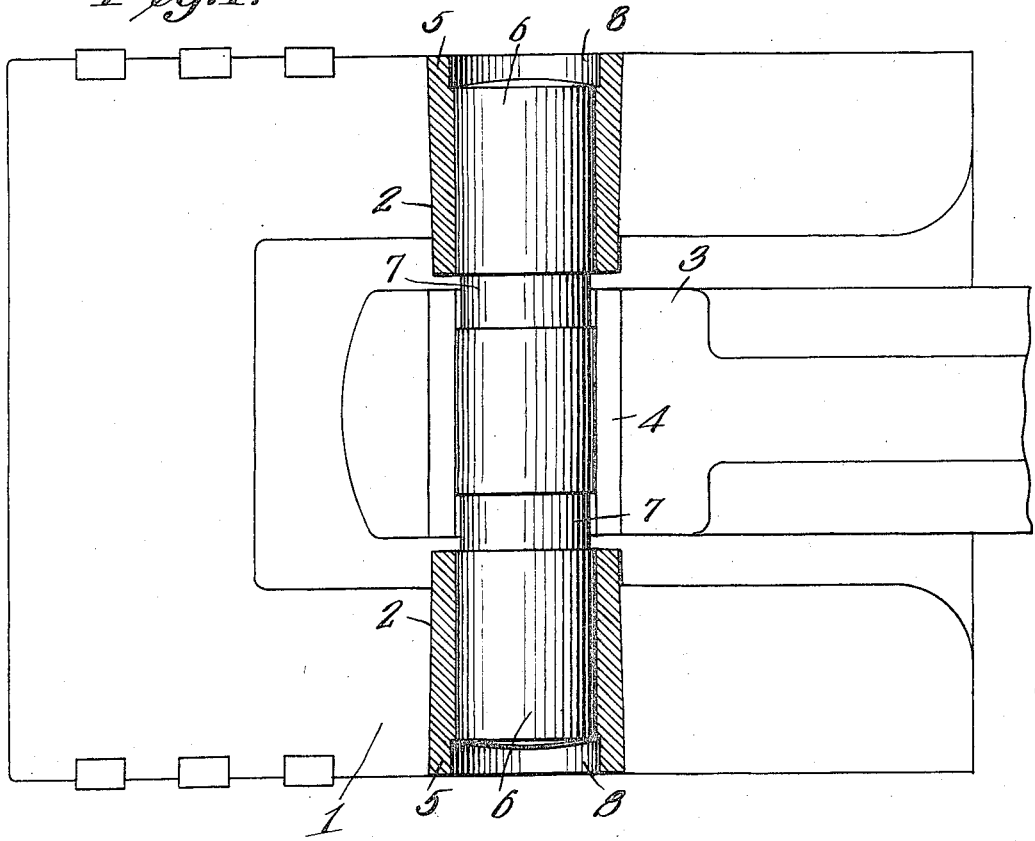
Figure 2:
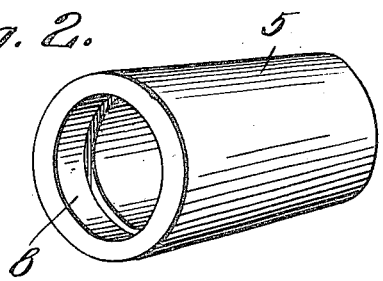

One practical form of construction and assembly will be described and illustrated in the accompanying drawings, in which:

Figure 1 is a longitudinal section through the improved bushings as applied to a piston, the pin being shown in position and Fig. 2 is a detail in perspective of one of the bushings.

In the preferred embodiment about to be described, a conventional internal combustion engine piston 1 is shown to indicate the manner of employing the invention therein. At points intermediate the length of the piston, it is drilled and the holes 2 so drilled are diametrically opposite to each other. It is the usual practice to form these piston pin bushing holes 2 of one diameter throughout. In the present invention these holes are tapered inwardly.

The piston 1 is usually provided with strengthening ribs so placed that the holes 2 will pass therethrough. This is done to provide a larger contacting surface than if merely a piston wall was used. The space between the ribs affords sufficient room for the small end of the connecting rod 3 to move therebetween. This connecting rod 3 may be supplied with the bushing or sleeve 4 as shown.

The bushings 5 are made slightly tapering and of the same degree as tapered hole 2. These bushings 5 are of such diameter that they will fit in the holes 2 with a "driving fit." As the bushings are intended to be driven into the holes 2 the bushings should when new, be inserted into the bushing hole 2 of the piston 1 so as to lie flush with the outer surface of the piston. Then as the hole or bore through the bushing becomes enlarged and its shape changed by wear, the bushing may be driven in a slight distance.

The walls of the hole 2 are tapered and the bushings 5 are slightly tapered exteriorly; forcing the bushing inwardly will tend to cause the fibers of the metal to lie closer together thus compacting the metal. This will make the metal more homogeneous and therefore make a better bearing. These bushings may be made of any metal suitable for bearings, such as bronze, brass, or of other alloys.

The bushings 5 are provided with straight cylindrical bores adapted to receive a piston pin 6. This pin is formed with spaced annular grooves 7 forming three spaced bearing portions. The end portions are inserted in the bores of the bushings 5, and the bushing 4 of the connecting rod 3 engages with the central bearing portion.

In taking up the wear, the tapered wall of the bushings 5 being in a "driving fit" engagement with the holes 2 the bushing tends to constrict, lessen, or reduce the diameter of the bore as the bushing is driven inwardly. Upon driving the bushing inwardly, a cold flowing of the metal is produced and as its passage inward is restrained it tends to move radially of the bore and thus makes smaller the bore in the bushing. The bushings 5, may be provided at their outer ends with a counter bored portion 8 concentric with the bore to facilitate driving the bushings home.

From the foregoing, it will be appreciated by workers in the art that I have provided an extremely simple wear compensating bushing and one which will prevent lateral or radial movement of the connecting pin, by merely adjusting the bushings from time to time, according to the amount of wear directed thereupon.

I am aware that changes may be made in the various arrangements of combinations or parts as well as in the details of the construction of the same, without departing from the scope of the present invention, as defined in the appended claims. Hence, I do not limit my invention to the exact arrangements and combinations of the device and parts, as illustrated in the accompanying drawings, and as described in the accompanying specification, nor do I confine myself to the exact details of the constructions of the said parts.

I claim:

1. A bushing for bearings, which comprises a hollow cylindrical body tapered exteriorly and having a counter bored portion at one end.

2. An adjustable bushing for bearings, including, in combination with a connecting pin, a hollow cylindrical tapered body having an annularly disposed reduced portion formed upon one end thereof, and a reduced portion formed in the connecting pin adjacent the inner end of the body for permitting inward movement of the same when desired.

3. An adjustable bushing having an annular shoulder upon the interior thereof.

4. A bushing comprising a tapering body having an annular shoulder upon the interior thereof.

5. A bushing having an annular shoulder upon the interior adapted to be engaged by an implement when mounting the bushing.

6. A bushing of substantially frusto-conical configuration, the interior of said bushing being reduced at one end to provide an annular shoulder.

7. In a piston pin bearing, the combination with a piston having tapered openings provided therein, of tapered unbroken bushings inserted in said openings, each of said bushings being adapted to receive the ends of a piston pin, and to be frictionally held in the opening.

8. A bushing for bearings, which comprises a body having a straight cylindrical bore therethrough, and having at one end thereof a counter bored portion concentric to the bore, said body being tapered exteriorly.

9. The combination with a piston and a piston pin therefor, said piston having tapered pin bushing holes, of a bushing for each of said holes, said bushings being adapted to move in their respective holes for lessening the inner diameter of said bushing, the taper of the hole serving to frictionally hold the bushing.

10. The combination with a piston having piston pin bushing holes, of a bushing having a tapered exterior, with a one diameter bore therethrough, said bushings adapted to be inserted in said holes, a piston pin having spaced annular grooves to provide spaced bearing surfaces, certain of said surfaces being adapted for insertion into the bores of the bushings, and said bushings being provided at one end with a counter bore, the bushings being adapted by their tapered exterior and the tapered holes of being moved inwardly to reduce the diameter of the bore and to reform the bore to fit the piston pin after said bore has been enlarged.

11. A frictionally held and continuous walled bushing for bearings whose walls are adapted to be moved radially inward for maintaining and reforming the cylindricity of the bore.

12. As a new article of manufacture, a continuous walled bushing having a tapered exterior and provided with a cylindrical bore therethrough, which bore has a counter-bored portion adjacent the larger end of the bushing, the walls of the bushing being capable of radial inward movement for lessening the interior and exterior diameters and for maintaining the cylindricity of the bore.

In testimony whereof I affix my signature in presence of two witnesses.

FRED W. KEAGLE.

Witnesses:
BENNETT F. ROSTOD,
O. J. BUTICOFER.